US012600203B2

(12) United States Patent
Kim et al.

(10) Patent No.: US 12,600,203 B2
(45) Date of Patent: Apr. 14, 2026

(54) VEHICLE AIR CONDITIONER HAVING PHOTOCATALYST MODULE

(71) Applicant: Hanon Systems, Daejeon (KR)

(72) Inventors: Jae Ho Kim, Daejeon (KR); Ji-Yong Park, Daejeon (KR); Tae Yong Park, Daejeon (KR); Su Jin Woo, Daejeon (KR); Sung Je Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 431 days.

(21) Appl. No.: 18/037,847

(22) PCT Filed: Dec. 28, 2021

(86) PCT No.: PCT/KR2021/020082
§ 371 (c)(1),
(2) Date: May 19, 2023

(87) PCT Pub. No.: WO2022/145991
PCT Pub. Date: Jul. 7, 2022

(65) Prior Publication Data
US 2024/0010050 A1     Jan. 11, 2024

(30) Foreign Application Priority Data

Dec. 29, 2020     (KR) ........................ 10-2020-0186463

(51) Int. Cl.
*B60H 3/00*          (2006.01)
*B60H 1/00*          (2006.01)
(52) U.S. Cl.
CPC ....... *B60H 3/0078* (2013.01); *B60H 1/00457* (2013.01); *B60H 1/00521* (2013.01); *B60H 1/00564* (2013.01); *B60H 2001/00635* (2013.01)

(58) Field of Classification Search
CPC ........... B60H 1/00547; B60H 1/00521; B60H 1/00564; B60H 3/0078; B60H 3/0608;
(Continued)

(56) References Cited

U.S. PATENT DOCUMENTS

| | | |
|---|---|---|
| 2010/0035534 A1 | 2/2010 | Kajiya |
| 2020/0171925 A1 | 6/2020 | Matsumoto et al. |
| 2020/0324626 A1 | 10/2020 | Ko et al. |

FOREIGN PATENT DOCUMENTS

| | | |
|---|---|---|
| CN | 110382268 | 10/2020 |
| JP | 2004291864 A | 10/2004 |

(Continued)

OTHER PUBLICATIONS

English translation of Official Action issued Jun. 27, 2025 in related Chinese Patent Application No. 202180078225.7, 20 pgs.

*Primary Examiner* — Allen R. B. Schult
(74) *Attorney, Agent, or Firm* — NORTON ROSE FULBRIGHT US LLP

(57)                ABSTRACT

The present invention relates to a vehicle air conditioner having a photocatalyst module, i.e., a two-layered flow air conditioner in which an inner flow path of the air conditioner is divided into an upper flow path and a lower flow path, the air conditioner providing an optimal design location and a mounting structure of a photocatalyst module which are capable of purifying both the upper flow path and the lower flow path by using a minimum number of photocatalyst modules.

8 Claims, 11 Drawing Sheets

(58) Field of Classification Search
CPC .... B60H 2001/00635; B60H 2003/065; B60H
2003/0675
See application file for complete search history.

(56) References Cited

FOREIGN PATENT DOCUMENTS

| | | | | | |
|---|---|---|---|---|---|
| JP | 2020082038 | A | | 6/2020 | |
| KR | 10-1092016 | B1 | | 12/2011 | |
| KR | 2015-0125749 | A | | 11/2015 | |
| KR | 10-2019-0062211 | A | | 6/2019 | |
| KR | 20190061776 | A | * | 6/2019 | ............... A61L 9/22 |
| WO | WO-2015167110 | A1 | * | 11/2015 | ........... B60H 3/0658 |

* cited by examiner (a)                              (b)

VEHICLE AIR CONDITIONER HAVING PHOTOCATALYST MODULE

CROSS REFERENCE TO RELATED APPLICATIONS

This application is a national phase under 35 U.S.C. § 371 of International Application No. PCT/KR2021/020082 filed on Dec. 28, 2021, which claims the benefit of priority from Korean Patent Application No. 10-2020-0186463 filed on Dec. 29, 2020. The entire contents of these applications are incorporated herein by reference in their entirety.

TECHNICAL FIELD

The present invention relates to a vehicle air conditioner, and more particularly, to a vehicle air conditioner having a photocatalyst module, i.e., a two-layered flow air conditioner in which an inner flow path of the air conditioner is divided into an upper flow path and a lower flow path, the air conditioner providing an optimal design location and a mounting structure of a photocatalyst module which are capable of purifying both the upper flow path and the lower flow path by using a minimum number of photocatalyst modules.

BACKGROUND ART

A vehicle air conditioner refers to a device configured to heat or cool a vehicle interior by introducing outside air into the vehicle interior or circulating inside air in the vehicle interior to heat or cool the air. The vehicle air conditioner includes: a blower unit configured to introduce inside air or outside air and blow the air, and an air conditioning unit configured to condition the air blown from the blower unit and discharge the air into the vehicle interior.

There have been proposed various methods for providing comfort to a driver by purifying air before the air having passed through the air conditioner is discharged into the vehicle interior. Among the methods, as illustrated in FIG. 1, there is a method that purifies air by a photocatalyst module 4 provided in an air passageway of an air conditioner 3.

Meanwhile, recently, among the air conditioners, a two-layered flow air conditioner has been applied which simultaneously sucks inside air and outside air, allows the sucked inside air to flow through an evaporator and a heater core, and then discharges the air through a floor vent toward a floor surface of an occupant compartment. The two-layered flow air conditioner allows the sucked outside air to flow through the evaporator and the heater core, and then discharges the air through a defrost vent toward a vehicle window. As illustrated in FIG. 2, in the two-layered flow air conditioner, a partial section of an air passageway in an air conditioner 7 is divided into upper and lower spaces by a partition wall 8 to define an upper flow path 8a and a lower flow path 8b. The outside air may flow through the upper flow path 8a, and the inside air may flow through the lower flow path 8b.

Even in the case of the above-mentioned two-layered flow air conditioner, it is necessary to purify air by using the photocatalyst module. Because an inner flow path of the two-layered flow air conditioner is divided into the outside air flow path and the inside air flow path, it is possible to consider a configuration in which a plurality of photocatalyst modules is respectively provided in the flow paths. However, the configuration in which the plurality of photocatalyst modules is provided is restricted in consideration of a narrow mounting space for the photocatalyst module in the air conditioner, a relatively large amount of costs of the photocatalyst module, and the like. Therefore, there is a need for an optimal design location or structure capable of exhibiting maximum performance by using a minimum number of photocatalyst modules.

DOCUMENT OF RELATED ART (Patent Document 1) Korean Patent Application Laid-Open No. 2015-0125749 (Nov. 10, 2015)

DISCLOSURE

Technical Problem

The present invention has been made in an effort to solve the above-mentioned problems, and an object of the present invention is to provide an optimal design location or mounting structure for a photocatalyst module capable of exhibiting maximum performance by using a minimum number of photocatalyst modules.

Technical Solution

A vehicle air conditioner according to one aspect of the present invention includes: a duct configured to connect a blower unit, which introduces inside air and outside air, and an air conditioning unit, which exchanges heat with the introduced inside and outside air, so that the air flows between the blower unit and the air conditioning unit; and a photocatalyst module including a body having a light source therein, and a carrier disposed below the body and configured to generate a superoxide radicals by generating a photocatalyst reaction by using light emitted from the light source, in which an inner flow path of the duct, in which the inside air and the outside air flow, is divided into an upper flow path and a lower flow path by a separation wall, and in which the photocatalyst module is disposed to generate the superoxide radicals in both the upper flow path and the lower flow path of the duct.

The duct may have a photocatalyst module mounting part having a hollow shape therein so that the carrier of the photocatalyst module passes through the photocatalyst module mounting part, and the photocatalyst module mounting part may be provided on a lateral outer wall of the duct.

The photocatalyst module may be mounted on the photocatalyst module mounting part, such that a part of the carrier may be positioned in the upper flow path, and the remaining part of the carrier may be positioned in the lower flow path, with the separation wall interposed therebetween.

A recessed groove may be formed in the separation wall, recessed inward, and disposed at a position corresponding to the photocatalyst module mounting part, and the recessed groove may have a size and shape corresponding to those of the carrier protruding toward the inside of the duct so as to accommodate the carrier protruding toward the inside of the duct as the photocatalyst module is mounted on the photocatalyst module mounting part.

A sealing member may be provided between the carrier and an interface of the recessed groove and prevent a flow of air between the upper flow path and the lower flow path.

The sealing member is made of an elastic material, and one side of the sealing member may be in close contact with the carrier, and the other side of the sealing member may be in close contact with the separation wall positioned on the interface of the recessed groove.

A thickness of the sealing member may be larger than a thickness of the separation wall, such that the sealing member may surround upper and lower surfaces of the separation wall from a boundary of the recessed groove to a predetermined distance.

The carrier of the photocatalyst module may include first and second carriers disposed below the body and spaced apart from each other at a predetermined interval.

The photocatalyst module may be mounted on the photocatalyst module mounting part, such that the first carrier may be positioned in the upper flow path, and the second carrier may be positioned in the lower flow path, with the separation wall interposed therebetween.

A spacing distance between the first carrier and the second carrier, which are spaced apart from each other, may be equal to or larger than a thickness of the separation wall.

A size of the first carrier and a size of the second carrier may be substantially equal to each other.

The body of the photocatalyst module may have only the single light source.

Advantageous Effects

The present invention adopts the mounting structure that uses the single photocatalyst module so that a part of the carrier is positioned in the upper flow path, and the remaining part of the carrier is positioned in the lower flow path. Therefore, only the single photocatalyst module may purify the air flowing in each of the flow paths, thereby reducing an overall packaging size of the air conditioner and reducing costs required to manufacture the air conditioner.

DESCRIPTION OF DRAWINGS

FIG. 7 is a view illustrating a photocatalyst module mounting structure according to the embodiment of the present invention.

BEST MODE

Hereinafter, the present invention will be described with reference to the accompanying drawings.

Figure 1:
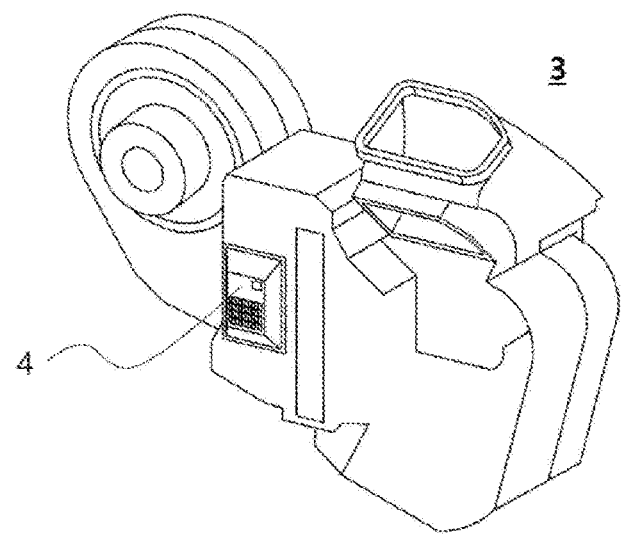
FIG. 1 is a view related to a vehicle air conditioner having a photocatalyst module in the related art.
Figure 2:
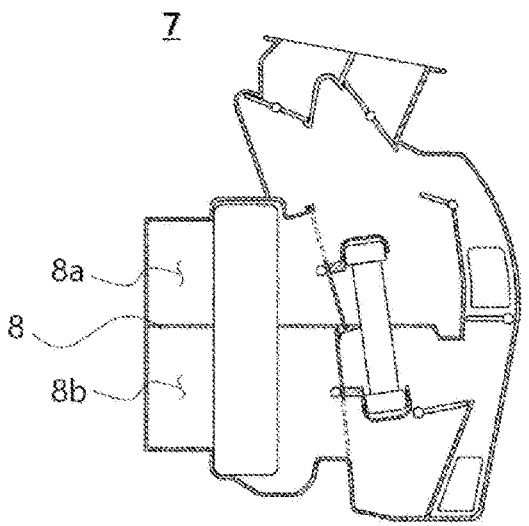
FIG. 2 is a view related to a two-layered flow air conditioner in the related art.
Figure 3:
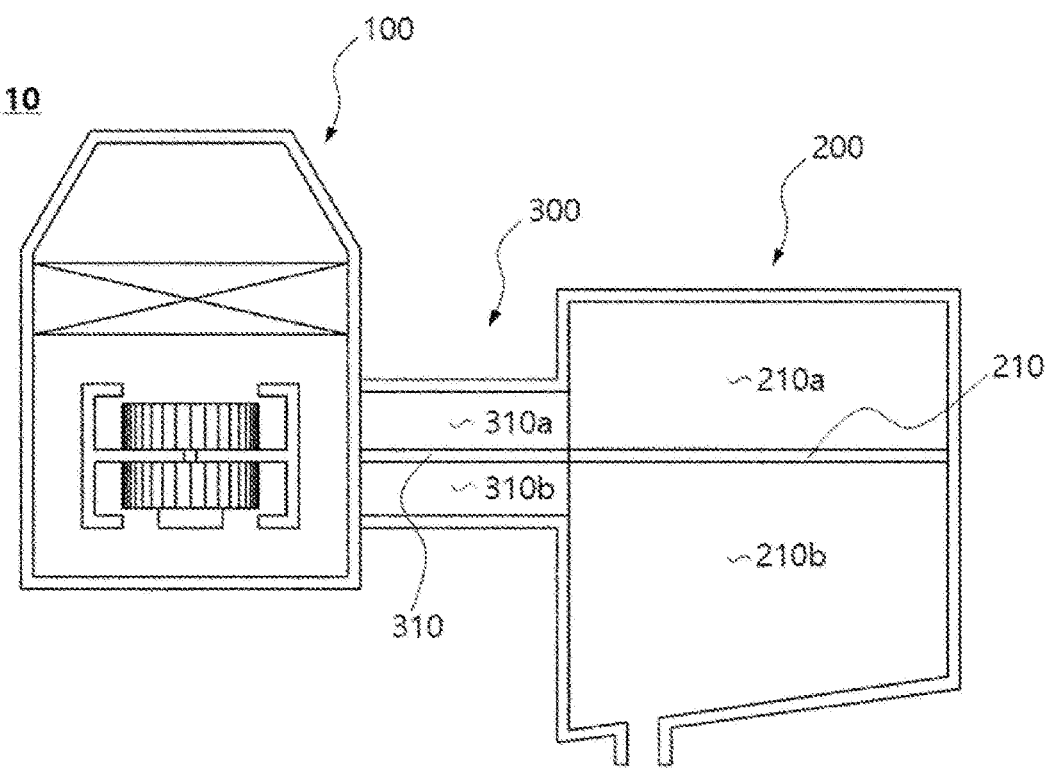
FIG. 3 is a view schematically illustrating a two-layered flow air conditioner according to an embodiment of the present invention.

FIG. 3 is a view schematically illustrating a two-layered flow air conditioner according to an embodiment of the present invention. An air conditioner 10 may include: a blower unit 100 configured to introduce inside air and outside air; an air conditioning unit 200 configured to exchange heat with the introduced inside and outside air; and a duct 300 configured to connect the blower unit and the air conditioning unit so that the air flows between the blower unit and the air conditioning unit.

In the two-layered flow air conditioner 10, an upper portion of the blower unit 100 may have an outside air inlet configured to provide a passageway through which outside air is sucked, and an inside air inlet configured to provide a passageway through which inside air is sucked. An internal space may be divided into an upper space and a lower space by a partition wall. In this case, outside air or water, which is sucked through the outside air inlet, may be introduced into the upper space defined by the partition wall, and inside air, which is sucked through the inside air inlet, may be introduced into the lower space defined by the partition wall.

The air conditioning unit 200 serves to condition the inside and outside air introduced through the blower unit. An evaporator and a heater core may be disposed in an internal space of the air conditioning unit 200. A plurality of air discharge ports, such as a defrost vent, a floor vent, and a face vent may be formed in the internal space of the air conditioning unit 200. Doors may be coupled to the discharge ports, respectively. The internal space of the air conditioning unit 200 may be divided into an upper space 210a and a lower space 210b by a partition wall 210.

The duct 300 serves to connect the blower unit and the air conditioning unit. An internal space of the duct, which has an inner flow path through which inside air and outside air flow, may be divided into an upper flow path 310a and a lower flow path 310b by a separation wall 310. In this case, an upper space of the blower unit may be connected to the upper space 210a of the air conditioning unit 200 through the upper flow path 310a of the duct 300, and a lower space of the blower unit may be connected to the lower space 210b of the air conditioning unit 200 through the lower flow path 310b of the duct 300.

As described above, an inside/outside air flow path of the two-layered flow air conditioner 10, which is connected to the air conditioning unit through the duct from the blower unit, may be divided into the upper flow path and the lower flow path by the separation wall. In this structure, it is necessary to purify both the air having passed through the upper flow path and the air having passed through the lower flow path by using a photocatalyst module.

Figure 4:
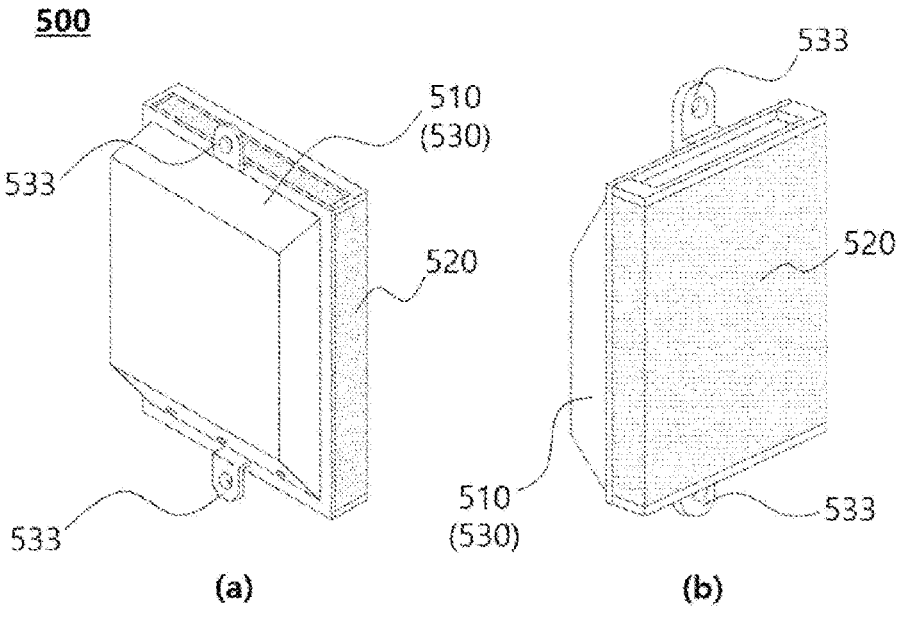
FIGS. 4A and 4B are front and rear perspective views of a photocatalyst module according to the embodiment of the present invention.
Figure 5:
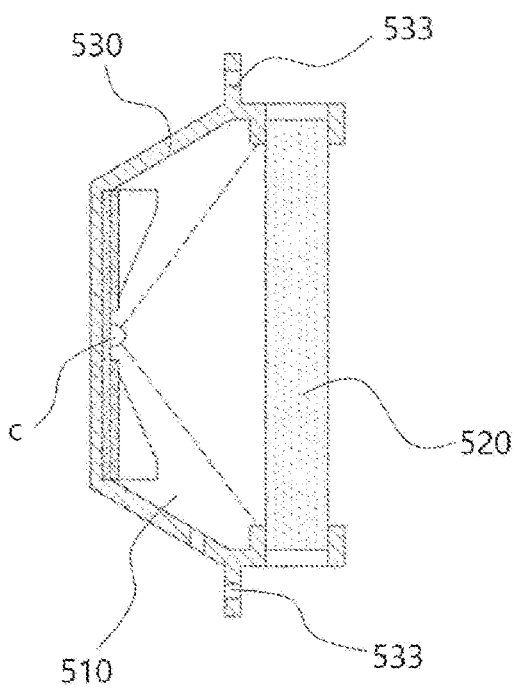
FIG. 5 is a transparent cross-sectional view of the photocatalyst module in FIG. 4.

Meanwhile, FIG. 4 illustrates a photocatalyst module 500 according to an embodiment of the present invention, in which FIG. 4A is a top perspective view of the photocatalyst module, and FIG. 4B is a bottom perspective view of the photocatalyst module. FIG. 5 is a transparent cross-sectional view of the photocatalyst module in FIG. 4. As illustrated, the photocatalyst module 500 according to the embodiment of the present invention may include: a body 510 having a light source c therein; and a carrier 520 disposed below the body and configured to generate superoxide radicals by generating a photocatalytic reaction by using light emitted from the light source. The photocatalyst module 500 may further include a module casing 530 that accommodates the body 510 and the carrier 520, such that the photocatalyst module 500 may be modularized into a single module. Therefore, the photocatalyst module may be easily installed in the air conditioner and conveniently attached or detached, which may be advantageous in performing maintenance. In this case, as described below, the carrier 520 of the present invention may be provided as a single integrated carrier or a plurality of carriers.

Figure 6:
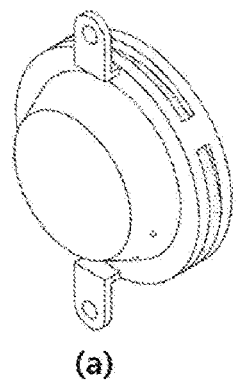
FIGS. 6A and 6B are front and rear perspective views of a photocatalyst module according to another embodiment of the present invention.
Figure 6:
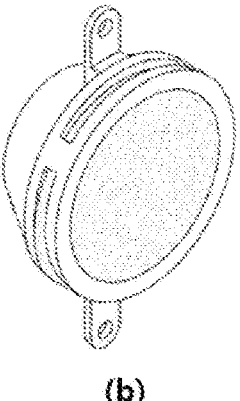

The carrier of the photocatalyst module may generate the superoxide radicals by generating the photocatalytic reaction by using the emitted light and be disposed to supply the generated superoxide radicals to the air flow path in the air conditioner. Contaminants introduced into the air conditioner, germs in an evaporator, various types of contaminants, and offensive odor may be removed by oxidation of the superoxide radicals generated by the photocatalyst module. More specifically, when the carrier absorbs ultraviolet rays emitted from the light source, electrons in a valence band filled with the electrons absorb light energy and jump to a conduction band that is not filled with the electrons. Positive holes, which are positions of the electrons in the valence band, oxidize water molecules on surfaces thereof and come into original states thereof, and the oxidized water molecules form OH radicals. In addition, excited electrons excited to the conduction band may react with oxygen and produce superoxide radicals with strong oxidizing power. As described above, in comparison with a structure that adsorbs and deodorizes contaminated air containing offensive odor, the photocatalyst module has the advantage of being able to be used almost semipermanently by selecting the type of carrier or performing appropriate On/Off control on the light source without changing a filter separately and the advantage of having excellent lifespan. Meanwhile, the photocatalyst module may have various shapes. As illustrated in FIG. 4, the photocatalyst module may have a quadrangular column shape as a whole. Alternatively, as illustrated in FIG. 6, the photocatalyst module may have a cylindrical shape. Meanwhile, in case that the photocatalyst module has a plurality of carriers as described below, a plurality of light sources may be provided in the plurality of carriers, respectively. However, this configuration increases costs required to manufacture the photocatalyst module. Therefore, the description will be described on the basis of a configuration in which only a single light source is provided.

Hereinafter, an optimal design location and a mounting structure of the photocatalyst module for purifying air by using the photocatalyst module in the two-layered flow air conditioner will be described.

Figure 7:
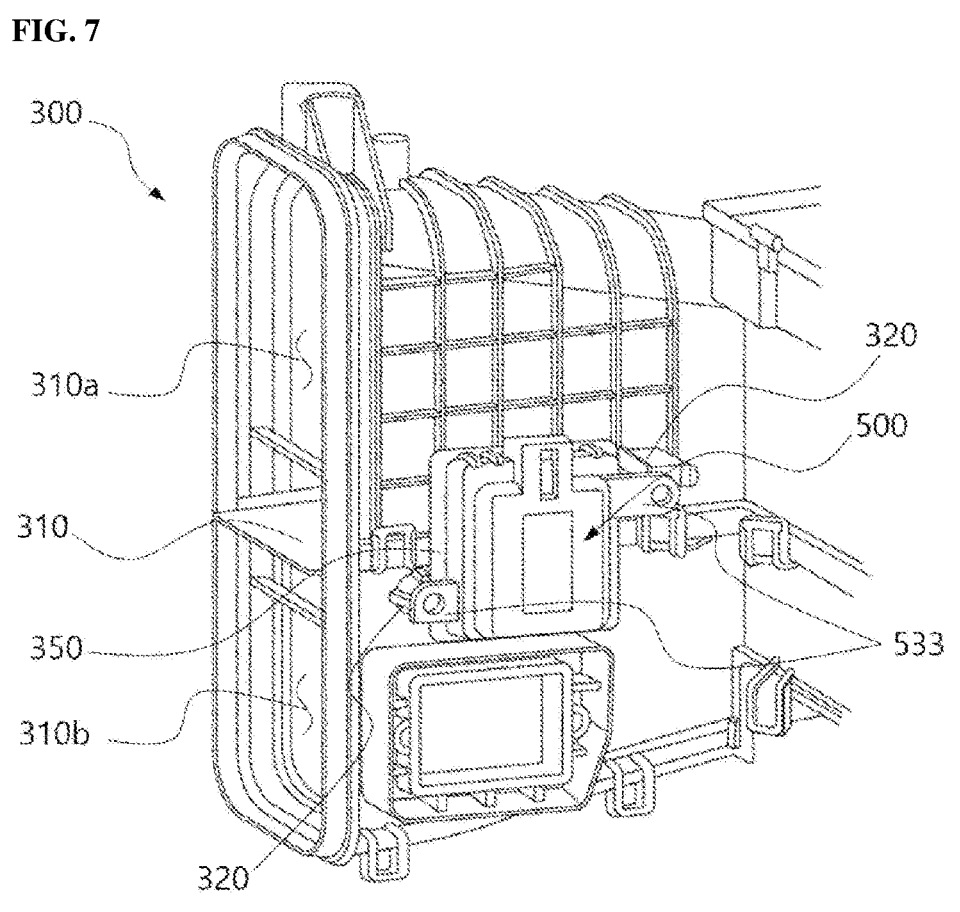

FIG. 7 illustrates a photocatalyst module mounting structure according to the embodiment of the present invention. As illustrated, the photocatalyst module mounting structure may be disposed so that the photocatalyst module 500 generates superoxide radicals in both the upper flow path 310*a* and the lower flow path 310*b* of the duct 300 in which the inner flow path of the duct 300, through which the inside air and the outside air flow, is divided into the upper flow path 310*a* and the lower flow path 310*b* by the separation wall 310.

More specifically, the duct 300 may include a photocatalyst module mounting part 350 having a hollow shape therein so that the carrier of the photocatalyst module may pass through the photocatalyst module mounting part 350.

As illustrated in FIG. 7, the photocatalyst module mounting part 350 may be provided on a lateral outer wall of the duct. The photocatalyst module mounting part 350 may include a mounting hole formed as a predetermined region of the lateral outer wall of the duct has a hollow portion. Because the photocatalyst module is mounted on the photocatalyst module mounting part, the carrier may pass through an outer wall of the duct and protrude toward the inside of the duct, and the mounting hole may be closed by the body of the photocatalyst module. In addition, to fix the photocatalyst module in a state of being coupled to the outer wall of the duct as described above, the module casing 530 may have a bracket 533, and a fastening means 320 may be further provided on the outer wall of the duct and disposed at a position corresponding to the bracket 533, such that the photocatalyst module may be securely fixed to the outer wall of the duct by bolting or the like between the bracket 533 and the fastening means 320.

Hereinafter, a case in which the photocatalyst module has a single carrier and a case in which the photocatalyst module has a plurality of carriers will be described in detail with reference to specific embodiments of the present invention.

Figure 8:
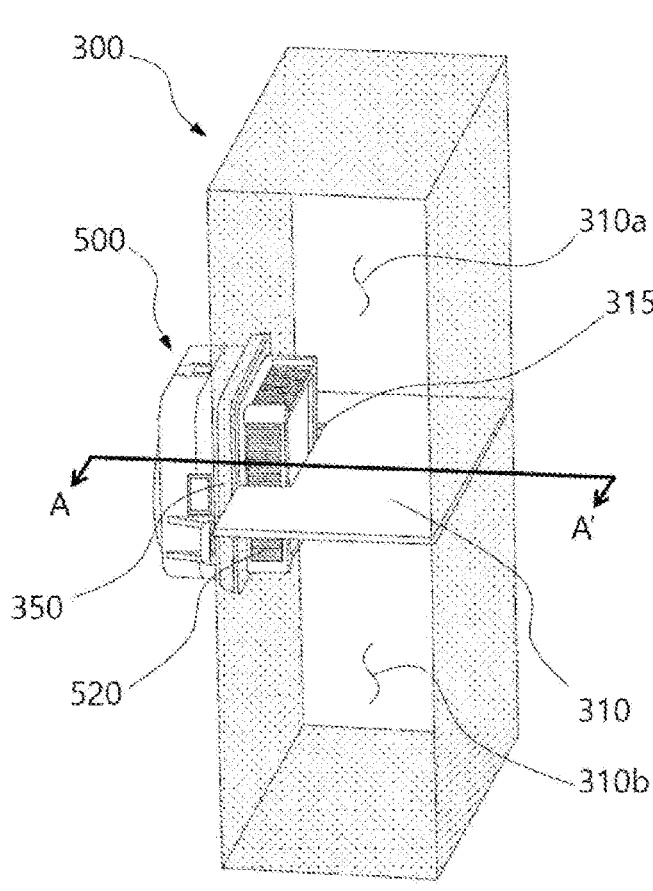
FIG. 8 is a view illustrating a photocatalyst module mounting structure according to a first example of the present invention.
Figure 9:
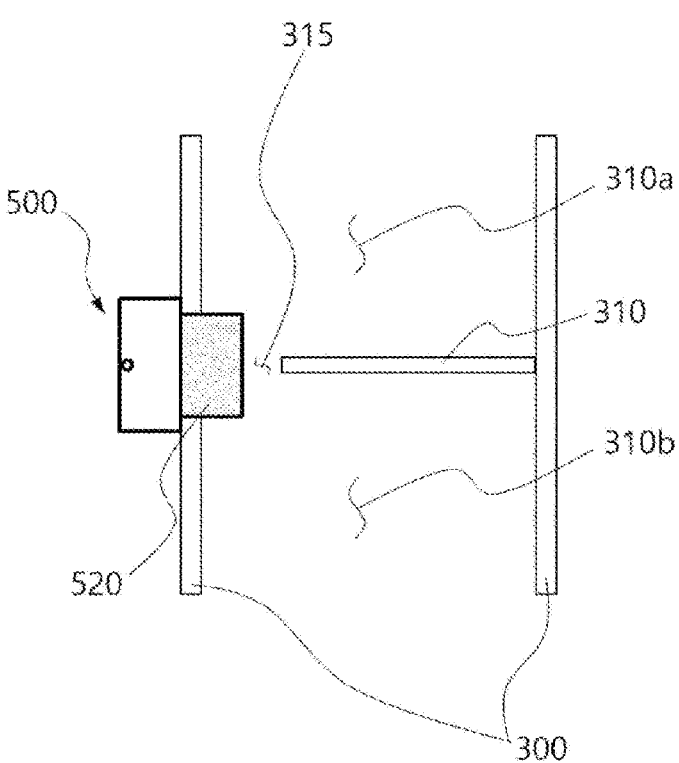
FIG. 9 is a view illustrating a cross-section taken along line A-A' in FIG. 8.

Photocatalyst Module Mounting Structure
According to First Example of Present Invention According to the present example, the photocatalyst module may have a single (integrated) carrier, like the photocatalyst module illustrated in FIG. 4. Specifically, FIG. 8 illustrates the duct 300 and the photocatalyst module 500 mounted on the duct in the vehicle air conditioner according to the first example of the present invention, and FIG. 9 illustrates a cross-section taken along line A-A' in FIG. 8. As illustrated, as the photocatalyst module 500 is mounted on the photocatalyst module mounting part 350, a part of the carrier 520 may be positioned in the upper flow path 310*a*, and the remaining part of the carrier 520 may be positioned in the lower flow path 310*b*, with the separation wall 310 interposed therebetween.

That is, the photocatalyst module mounting part 350 may be provided and positioned on the outer wall of the duct so that the photocatalyst module mounting part 350 may pass the same plane of the separation wall 310. In this case, more particularly, the photocatalyst module mounting part 350 may be provided and positioned so that the same plane of the separation wall 310 passes through a center of the photocatalyst module mounting part 350. When the photocatalyst module is mounted on the outer wall of the duct as the photocatalyst module mounting part is provided, a part of the carrier may be positioned in the upper flow path, and the remaining part of the carrier may be positioned in the lower flow path, with the separation wall interposed therebetween, as illustrated.

In this regard, in the background technology, it is possible to consider a configuration in which photocatalyst modules are respectively mounted in the upper flow path and the lower flow path, as illustrated. However, this configuration causes a practical difficulty because a mounting space for the duct is narrow. Further, this configuration causes a problem in that the overall cost required to manufacture the air conditioner is increased because of the relatively high price of the photocatalyst module. The present invention adopts the mounting structure for the single photocatalyst module that is provided so that a part of the carrier is positioned in the upper flow path, and the remaining part of the carrier is positioned in the lower flow path. Therefore, only the single photocatalyst module may purify the air flowing in each of the flow paths, thereby reducing an overall packaging size of the air conditioner and reducing costs required to manufacture the air conditioner.

In this case, as illustrated in FIGS. 8 and 9, the separation wall 310 may have a recessed groove 315 recessed inward and disposed at a position corresponding to the photocatalyst module mounting part. The recessed groove 315 may have a size and shape corresponding to those of the carrier protruding toward the inside of the duct so as to accommodate the carrier 520 protruding toward the inside of the duct while passing through the outer wall of the duct as the photocatalyst module is mounted on the photocatalyst module mounting part. Because the recessed groove is formed in the separation wall, it is possible to facilitate a process of mounting the photocatalyst module and prevent the carrier from being damaged by the separation wall at the time of mounting the photocatalyst module.

Meanwhile, in case that the recessed groove 315 is formed in the separation wall 310, air may flow between the upper flow path 310a and the lower flow path 310b. When the carrier protrudes as the photocatalyst module is mounted on the photocatalyst module mounting part, air may flow through a gap between the carrier and the recessed groove even though the recessed groove is partially closed, which may degrade air conditioning performance of the left/right independent air conditioner.

Figure 10:
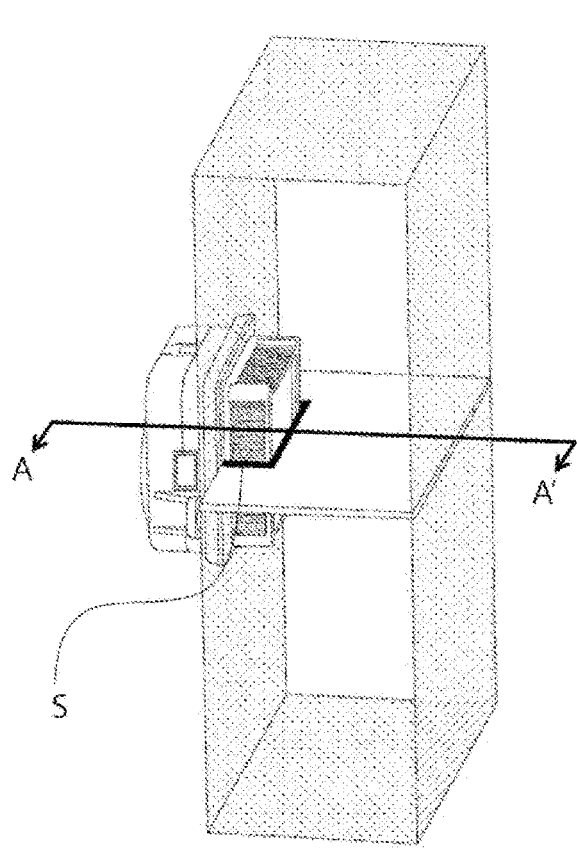
FIG. 10 is a view illustrating a configuration in FIG. 8 in which a sealing member is further provided.
Figure 11:
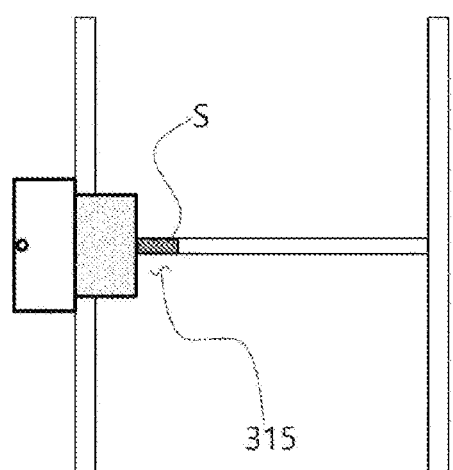
FIG. 11 is a view illustrating a cross-section taken along line A-A' in FIG. 10.

To prevent the degradation, the present invention may further provide a sealing member S provided between the carrier 520 and the recessed groove 315, i.e., between the carrier 520 and the separation wall positioned on an interface of the recessed groove to prevent a flow of air between the upper flow path 310a and the lower flow path 310b. FIG. 10 illustrates a configuration in FIG. 8 in which the sealing member S is further provided, and FIG. 11 illustrates a cross-section taken along line A-A' in FIG. 10. As illustrated, the sealing member S may be further provided between the carrier 520 and the recessed groove 315. Therefore, it is possible to prevent a flow of air between the upper flow path 310a and the lower flow path 310b. More specifically, the sealing member S may be made of an elastic material. Therefore, one side of the sealing member may be in close contact with the carrier, and the other side of the sealing member may be in close contact with the separation wall positioned on the interface of the recessed groove.

Figure 12:
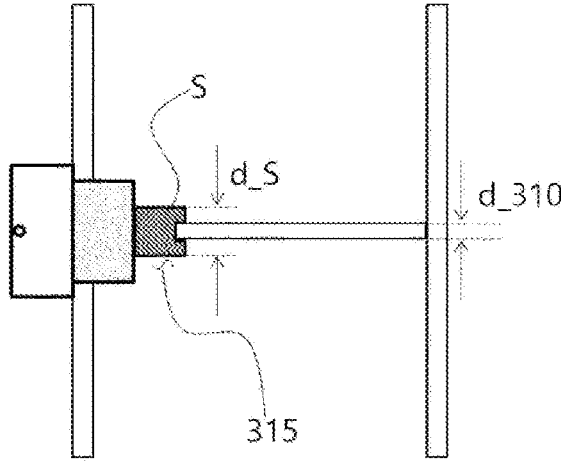
FIG. 12 is a view illustrating a configuration in FIG. 11 in which a thick sealing member is provided.

In this case, to further improve sealability, a thickness of the sealing member may be larger than a thickness of the separation wall. FIG. 12 illustrates that a thick sealing member in FIG. 11 is provided. As illustrated, a thickness d_S of the sealing member may be larger than a thickness d_310 of the separation wall. Furthermore, the sealing member S may surround upper and lower surfaces of the separation wall 310 from a boundary of the recessed groove 15 to a predetermined distance. This configuration may not only more assuredly prevent a flow of air between the upper flow path and the lower flow path but also fit and fix the sealing member to the separation wall corresponding to the recessed groove at the time of mounting the sealing member in the recessed groove, thereby providing ease of mounting.

Figure 13:
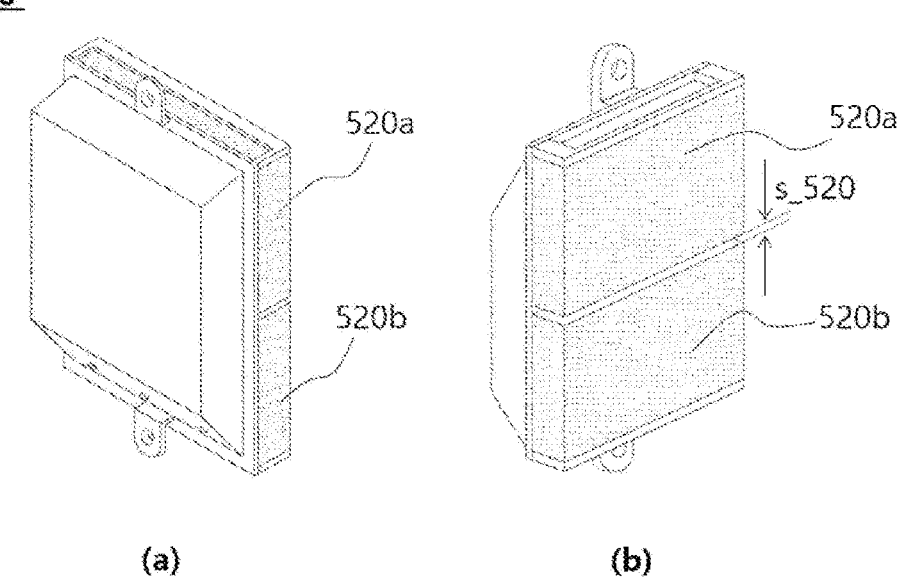
FIG. 13 is a view illustrating a photocatalyst module according to a second example of the present invention.

Photocatalyst Module Mounting Structure According to Second Example of Present Invention According to the present example, the photocatalyst module may have a plurality of carriers. Specifically, FIG. 13 illustrates the photocatalyst module according to the second example of the present invention. As illustrated, in a photocatalyst module 500', the carrier 520 may be disposed below the body 510 and include a first carrier 520a and a second carrier 520b that are spaced apart from each other at a predetermined interval.

Figure 14:
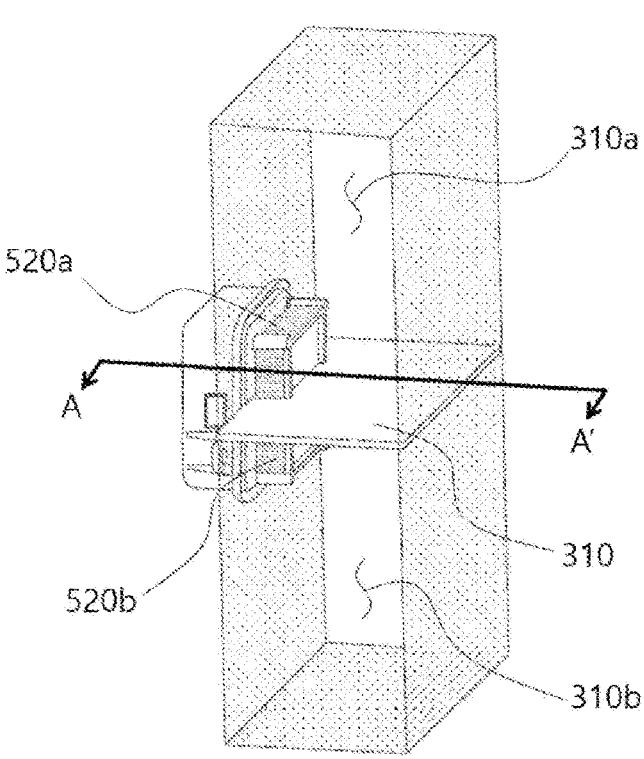
FIG. 14 is a view illustrating a photocatalyst module mounting structure according to a second example of the present invention.
Figure 15:
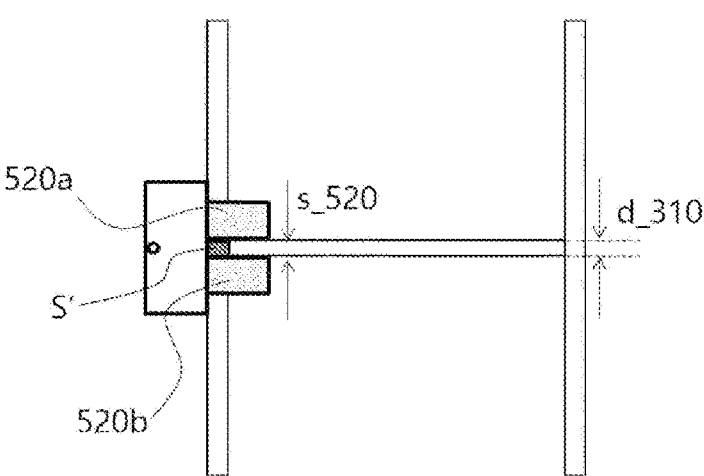
FIG. 15 is a view illustrating a cross-section taken along line A-A' in FIG. 14.

FIG. 14 illustrates the duct 300 and the photocatalyst module 500' mounted on the duct in the vehicle air conditioner according to the second example of the present invention, and FIG. 15 illustrates a cross-section taken along line A-A' in FIG. 14. As illustrated, in the vehicle air conditioner according to the present example, as the photocatalyst module 500' is mounted on the photocatalyst module mounting part 350, the first carrier 520a may be positioned in the upper flow path 310a, and the second carrier 520b may be positioned in the lower flow path 310b, with the separation wall 310 interposed therebetween.

That is, according to the present example, the separation wall 310 may be inserted into a gap between the first carrier 520a and the second carrier 520b that are spaced apart from each other. Therefore, it is possible to reduce a total number of processes of manufacturing the air conditioner even though no recessed groove is formed in the separation wall, unlike the first example. Because the recessed groove need not be formed, the air does not flow between the upper flow path, the lower flow path, and the recessed groove, which may provide further excellence in sealability.

In this case, a spacing distance s_520 between the first and second carriers, which are spaced apart from each other, may be equal to or larger than the thickness d_310 of the separation wall. In case that the spacing distance is larger than the thickness of the separation wall, the assembling properties are excellent, but an effective area of the carrier may decrease. In case that the spacing distance is equal to the thickness of the separation wall, the assembling properties may somewhat decrease, but a maximum effective area of the carrier may be used. Therefore, the design may be performed by appropriately selecting the advantages of the above-mentioned cases. In addition, a size of the first carrier 520a and a size of the second carrier 520b may be substantially equal to each other, which may prevent an air purification ability between the upper flow path and the lower flow path from being biased to one side. Further, according to the present example, a partial gap may be present between the separation wall 310 and the body 510. Therefore, as illustrated in FIG. 15, a sealing member S' may be provided in the gap.

Meanwhile, in the present invention, the configuration has been described in which the photocatalyst module is provided on the lateral outer wall of the duct 200. However, the photocatalyst module, which has a structure identical to the above-mentioned structure, may, of course, be mounted on a lateral outer wall of the casing, which defines an air passageway of the blower unit 100, or a lateral outer wall of the casing, which defines an air passageway of the air conditioning unit 300, instead of the duct.

As described above, the vehicle air conditioner according to the present invention is the two-layered flow air conditioner that may provide the optimal design location and the mounting structure, which are capable of purifying both the upper air passageway and the lower air passageway by using a minimum number of photocatalyst modules.

While the embodiments of the present invention have been described with reference to the accompanying drawings, those skilled in the art will understand that the present invention may be carried out in any other specific form without changing the technical spirit or an essential feature thereof. Therefore, it should be understood that the above-described embodiments are illustrative in all aspects and do not limit the present invention.

DESCRIPTION OF REFERENCE NUMERALS

10: Vehicle air conditioner
100: Blower unit
200: Air conditioning unit
210: Partition wall
210*a*, 210*b*: Upper space, Lower space
300: Duct
310: Separation wall
310*a*, 310*b*: Upper flow path, Lower flow path
315: Recessed groove
350: Photocatalyst module mounting part
320: Fastening means
500, 500': Photocatalyst module
510: Body
520: Carrier
520*a*, 520*b*: First carrier, Second carrier
530: Module casing
S, S': Sealing member

The invention claimed is:

1. A vehicle air conditioner comprising:

a duct configured to connect a blower unit, which introduces inside air and outside air, and an air conditioning unit, which exchanges heat with the introduced inside and outside air, so that the air flows between the blower unit and the air conditioning unit; and a photocatalyst module comprising a body having a light source therein, and a carrier disposed below the body and configured to generate a superoxide radicals by generating a photocatalyst reaction by using light emitted from the light source, wherein an inner flow path of the duct, in which the inside air and the outside air flow, is divided into an upper flow path and a lower flow path by a separation wall, wherein the photocatalyst module is disposed to generate the superoxide radicals in both the upper flow path and the lower flow path of the duct, wherein the duct has a photocatalyst module mounting part having a hollow shape therein so that the carrier of the photocatalyst module passes through the photocatalyst module mounting part, and wherein the photocatalyst module mounting part is provided on a lateral outer wall of the duct, wherein the photocatalyst module is mounted on the photocatalyst module mounting part, such that a part of the carrier is positioned in the upper flow path, and the remaining part of the carrier is positioned in the lower flow path, with the separation wall interposed therebetween, wherein a recessed groove is formed in the separation wall, recessed inward, and disposed at a position corresponding to the photocatalyst module mounting part, wherein the recessed groove has a size and shape corresponding to those of the carrier protruding toward the inside of the duct so as to accommodate the carrier protruding toward the inside of the duct as the photocatalyst module is mounted on the photocatalyst module mounting part, and wherein a sealing member is provided between the carrier and an interface of the recessed groove and prevents a flow of air between the upper flow path and the lower flow path.

2. The vehicle air conditioner of claim 1, wherein the sealing member is made of an elastic material, and wherein one side of the sealing member is in close contact with the carrier, and the other side of the sealing member is in close contact with the separation wall positioned on the interface of the recessed groove.

3. The vehicle air conditioner of claim 2, wherein a thickness of the sealing member is larger than a thickness of the separation wall, such that the sealing member surrounds upper and lower surfaces of the separation wall from a boundary of the recessed groove to a predetermined distance.

4. The vehicle air conditioner of claim 1, wherein the body of the photocatalyst module has only the single light source.

5. A vehicle air conditioner comprising:

a duct configured to connect a blower unit, which introduces inside air and outside air, and an air conditioning unit, which exchanges heat with the introduced inside and outside air, so that the air flows between the blower unit and the air conditioning unit; and a photocatalyst module comprising a body having a light source therein, and a carrier disposed below the body and configured to generate a superoxide radicals by generating a photocatalyst reaction by using light emitted from the light source, wherein an inner flow path of the duct, in which the inside air and the outside air flow, is divided into an upper flow path and a lower flow path by a separation wall, wherein the photocatalyst module is disposed to generate the superoxide radicals in both the upper flow path and the lower flow path of the duct, wherein the duct has a photocatalyst module mounting part having a hollow shape therein so that the carrier of the photocatalyst module passes through the photocatalyst module mounting part, and wherein the photocatalyst module mounting part is provided on a lateral outer wall of the duct, and wherein the carrier of the photocatalyst module comprises first and second carriers disposed below the body and spaced apart from each other at a predetermined interval.

6. The vehicle air conditioner of claim 5, wherein the photocatalyst module is mounted on the photocatalyst module mounting part, such that the first carrier is positioned in the upper flow path, and the second carrier is positioned in the lower flow path, with the separation wall interposed therebetween.

7. The vehicle air conditioner of claim 5, wherein a spacing distance between the first carrier and the second carrier, which are spaced apart from each other, is equal to or larger than a thickness of the separation wall.

8. The vehicle air conditioner of claim 5, wherein a size of the first carrier and a size of the second carrier are substantially equal to each other.

* * * * *